United States Patent [19]

Kasahara et al.

[11] Patent Number: 4,734,448
[45] Date of Patent: Mar. 29, 1988

[54] PROPYLENE POLYMER COMPOSITION

[75] Inventors: Toshikazu Kasahara, Ichihara; Makoto Iida, Sodegaura, both of Japan

[73] Assignee: Idemitsu Petrochemical Co., Ltd., Japan

[21] Appl. No.: 880,012

[22] Filed: Jun. 30, 1986

[30] Foreign Application Priority Data

| Jul. 10, 1985 | [JP] | Japan | 60-150092 |
| Feb. 21, 1986 | [JP] | Japan | 61-34966 |
| Feb. 21, 1986 | [JP] | Japan | 61-34967 |
| Feb. 21, 1986 | [JP] | Japan | 61-34968 |

[51] Int. Cl.$^4$ .................. C08K 5/10; C08K 5/09; C08L 53/00
[52] U.S. Cl. ............... 524/317; 524/310; 524/312; 524/313; 524/314; 524/322; 524/323; 524/505; 524/528
[58] Field of Search ............. 524/310, 312, 313, 314, 524/317, 322, 505, 528; 525/323

[56] References Cited

U.S. PATENT DOCUMENTS

| 4,061,694 | 12/1977 | Castagna | 525/387 |
| 4,144,214 | 3/1979 | Corbacella | 524/317 |
| 4,184,987 | 1/1980 | Karayannis et al. | 524/146 |
| 4,312,964 | 1/1982 | Sekine et al. | 525/240 |
| 4,337,326 | 6/1982 | Shiga et al. | 525/323 |
| 4,433,110 | 2/1984 | Baba et al. | 525/323 |
| 4,493,923 | 1/1985 | McCullough | 525/88 |
| 4,550,145 | 10/1985 | Kasahara et al. | 525/323 |
| 4,565,844 | 1/1986 | Kasahara et al. | 524/288 |
| 4,626,565 | 12/1986 | Kawai et al. | 524/505 |

FOREIGN PATENT DOCUMENTS 0076444 6/1983 Japan .

*Primary Examiner*—Herbert J. Lilling
*Attorney, Agent, or Firm*—Antonelli, Terry & Wands

[57] ABSTRACT

A propylene polymer composition having excellent whitening resistance, impact resistance, rigidity and flowability.

The propylene polymer composition comprises (A) 100 parts by weight of a propylene polymer or a modified polymer obtained by heat-treating the propylene polymer in an organic peroxides and (B) 0.1 to 1.5 parts by weight of an ester of an aliphatic saturated monocarboxylic acid and a polyhydric alcohol, and the propylene polymer essentially consists of two particular polymer fractions or three particular polymer fractions polymerized over stereoregular catalysts and combinationed in a specific ratio.

8 Claims, No Drawings

PROPYLENE POLYMER COMPOSITION

BACKGROUND OF THE INVENTION

(1) Field of the Invention

This invention relates to a propylene polymer composition which may be suitably used as extrusion molding, injection molding and blow molding materials in the fields of car parts, home electric appliances, and so forth.

(2) Description of the Prior Art

Commercial propylene-ethylene copolymers referred to as "propylene block copolymers" are used favorably as resins of excellent impact resistance and rigidity in many industrial fields. However, there have been problems in their application for articles whose appearance is important, such as car parts and home electric appliances because, receiving impact, etc., the appearance of molding products tends to be suffered by whitening at the stress point due to their deficiency in whitening resistance.

In the past, methods of blending polyethylene with propylene copolymers were proposed to solve said problems (c. f. Japanese Patent Laid-open No. 58245/1980 and Japanese Patent Laid-open No. 13741/1982), but these methods were not sufficient in improvement of the impact whitening resistance, and had difficulty in homogenious blending. Another method for producing propylene copolymers by two stage polymerization was proposed (c.f. Japanese Patent Laid-open No. 55416/1981), but obtained products had no sufficient in the balance of impact resistance, rigidity and whitening resistance.

On the other hand, a method for modification of propylene copolymers by heat-treatment to improve the flowability was known (c.f. Japanese Patent Laid-open No. 76444/1983), but there was the defect that flowability and mechanical properties were not balanced.

SUMMARY OF THE INVENTION

An object of this invention is to provide a propylene polymer composition superior in whitening resistance, impact resistance, rigidity and flowability.

Thus, the propylene polymer composition of this invention comprises:

(A) 100 parts by weight of a propylene polymer or a modified polymer obtained by heat-treating said propylene polymer in the presence of an organic peroxide to a degradation degree of 1.2–80, said propylene polymer essentially consisting of the following two fractions (a) or three fractions (b) obtained by polymerization over a stereoregular catalyst:

(a)
  (i) 70–95% by weight of a propylene homopolymer or a propylene-ethylene copolymer having an ethylene content of not more than 2% by weight; and
  (ii) 30–5% by weight of a propylene-ethylene copolymer having an ethylene content of 10–50% by weight; or (b)
  (iii) 50–94% by weight of a propylene homopolymer having an intrinsic viscosity [$\eta$] of 0.5–2.5 dl/g; and
  (iv) 3–30% by weight of a propylene homopolymer having an intrinsic viscosity [$\eta$] of more than 2.5 dl/g; and
  (v) 3–30% by weight of a propylene-ethylene copolymer having an intrinsic viscosity [$\eta$] of not less than 2.8 dl/g; and (B) 0.02–2.0 parts by weight of an ester derived from an aliphatic saturated monocarboxylic acid of from 12 to 22 carbon atoms and a polyhydric alcohol.

DETAILED DESCRIPTION OF THE INVENTION

The propylene polymer (a) to be used in this invention is the product of a multistage polymerization process, such as a two stage polymerization process, over stereoregular catalysts.

The stereoregular catalysts to be used for polymerization are those commonly in the stereoregular polymerization reaction of a propylene, etc., consisting of transition metal halide component and an organic aluminium compound component. Suitable transition metal halides are titanium halides, and titanium trichloride is particularly suitable. Titanium trichloride includes: the product of reduction of titanium tetrachloride by various methods; the product of further activation of above mentioned product by bowl mill-treatment and/or solvent-washing (for example, washing with inert solvents and/or inert solvents containing polar componds); the product of further cogrinding of titanium trichroride or titanium trichloride eutectic mixture (for example, TiCl$_3$+⅓AlCl$_3$) with derivatives of an amine, an ether, an ester, sulfur or halogen, organic or inorganic nitrogen compounds or phosphorus compounds, etc.; the product precipitated from liquified titanium trichloride in the presence of ether compounds; the product obtained by the method disclosed in the specification of Japanese Patent Publication No. 3356/1978. Also, titanium halides supported on a magnesium compound may be employed.

As the organic aluminium compounds, the other component to be used in combination with the above mentioned transition metal halides component, the compounds represented by the following formula:

(in which, R is a C$_1$ to C$_{10}$ alkyl, alkoxyl or aryl group, X is a halogen atom, and n is a numerial value of 0<n≦3) are suitable. Concretely, the organic aluminium compounds include, for example, triethylaluminium, triisobutylaluminum, tri-n-propylaluminium, diethylaluminium monochloride, diethylaluminium monobromide, diethylaluminium monoiodide, diethylaluminium monoethoxide, diisobutylaluminium monoisobuthoxide, diethylaluminium monohydride, diisobutylaluminium monohydride, ethylaluminium sesquichloride, ethylaluminium dichloride, etc., and these compounds may be used either individually or in combination of two or more of them.

These catalyst components are used in a mixture wherein the molar ratio between the transition metal halides and the organic aluminium compounds is 1:1–100.

Also, many sorts of electron donative compounds may be used as the third component to improve the catalytic capacity.

Such stereoregular catalysts may be used at every stage of the polymerization reaction under usual conditions regarding the amount, the combination of components, etc., Any known method may be employed as the polymerization process, and these methods include, for example, slurry polymerization, solution polymerization, gas phase polymerization, liquid phase polymerization in which propylene and ethylene monomers are used as medium, etc.

When two stage polymerization process is employed for the preparation of the propylene polymer (a), the first stage is so controlled that 70-95% by weight of a propylene homopolymer or a propylene-ethylene copolymer having an ethylene content of not more than 2% by weight is formed in total polymer to be fraction (i). Preferably, the first stage is so controlled as to form 74-93% by weight of fraction (i). The use of copolymer having an ethylene content in the first stage of more than 2% by weight is unsuitable, causing the severe decrease of rigidity of obtained compositions.

The second stage is so controlled that the polymer obtained by the polymerization in the said first stage is further co-polymerized with the ethylene to form , in total polymer, 5-30% by weight, preferably 7-26% by weight, of a propylene-ethylene copolymer having an ethylene content of 10-50% by weight to be fraction (ii).

When a copolymer having an ethylene content of less than 10% by weight is used, the impact strength of obtained composition is decreased, on the other hand, when the ethylene content is more than 50% by weight, the improvement in whitening resistance of the composition is insufficient.

When the amount of produced propylene-ethylene copolymer, fraction (ii), is less than 5% by weight of total polymer, the impact strength of the composition is decreased, on the other hand, when more than 30% by weight, the rigidity of the composition is decreased.

The melt index of obtained propylene polymer (a) is 0.1-50 g/10 min., preferably 0.5-35 g/10 min.

From the viewpoint of structural characteristics, preferably propylene polymer obtained by the two stage process has a triad fraction: $[R]/f_{EEE}$ determined by $^{13}C$ - NMR of no less than 2, because polymers having no less than 2 of $[R]/f_{EEE}$ further increase the whitening resistance of the compositions prepared by the use of them.

Herein, [R] is the sum of the numbers of chains where a propylene unit and an ethylene unit are bonded ($f_{PPE}+f_{PEP}+f_{EEP}+f_{EPE}$, E represents an ethylene unit and P represents a propylene unit), and $f_{EEE}$ represents the chain wherein three ethylene units are bonded. When the triad fraction is determined, the judgement of peak assignment is carried out according to the method disclosed in "Macromolecules, Vol.11, P.33, 1978".

The propylene polymer (b) polymerized over the stereoregular catalysts to be used in this invention is the product of multistage polymerization process such as three stage polymerization process.

When a three stage polymerization using the stereoregular catalysts is employed for the preparation of the propylene polymer (b), in the first stage, propylene is polymerized at a temperature of 30°-90 ° C. to form 50-94% by weight of the propylene homopolymer named fraction (iii) having an intrinsic viscosity [η] of 0.5-2.5 dl/g in total polymer, then, in the second stage, propylene is polymerized at a temperature of 30-90° C. to form 3-30% by weight of the propylene homopolymer named fraction (iv) having an intrinsic viscosity [η] of more than 2.5 dl/g in total polymer, thereafter, in the third stage, ethylene and propylene are copolymerized at a temperature of 30-90° C. to form 3-30% by weight of the ethylene-propylene copolymer named fraction (v) having an intrinsic viscosity of not less than 2.8 dl/g in total polymer.

The same stereoregular catalysts used in the preparation of the above mentioned propylene polymer (a) may be employed.

When the preparation is carried out by the three stage polymerization process, in the first stage, propylene is polymerized at a temperature of 30°-90° C., preferably 50°-70° C., to form 50-94% by weight, preferaby 60-85% by weight, of the propylene homopolymer named fraction (iii) having an intrinsic viscosity [η] of 0.5-2.5 dl/g , preferably 0.7-2.3 dl/g, in total polymer. When the polymerization temperature is lower than 30° C., the productivity of the polymer is decreased, and when [η] is less than 0.5 dl/g, the impact strength of obtained composition is decreased, on the other hand, when more than 2.5 dl/g, the moldability is decreased. Further, when the amount of the polymer is less than 50% by weight, the rigidity of obtained composition is decreased, and when exceeds 94% by weight, the impact strength of the composition is decreased.

Subsequently, in the second stage propylene is polymerized at a temperature of 30-90° C., preferably 40-70° C., to form 3-30% by weight, preferably 5-25% by weight, of the propylene homopolymer named fraction (iv) having an intrinsic viscosity [η] of more than 2.5 dl/g, preferably 2.6-10 dl/g, in total polymer. When the intrinsic viscosity [η] is not more than 2.5 dl/g, the impact strength of obtained composition is decreased, and when the amount of polymer is less than 3% by weight, the rigidity of the composition is decreased, on the other hand, when exceeds 30% by weight, the impact strength of the composition is decreased.

In the third stage, ethylene and propylene are copolymerized at a temperature of 30-90° C., preferably 40 - 70° C., to form 3-30% by weight, preferably 5-20% by weight of the ethylene-propylene copolymer named fraction (v) having an intrinsic viscosity [η] of no less than 2. 8 dl/g, preferably 3.0-12 dl/g, in total polymer.

When the intrinsic viscosity of fraction (v) is less than 2.8 dl/g, the impact strength of obtained composition is decreased, and when the amount of the copolymer is less than 3% by weight, the impact strength of the composition is decreased, on the other hand, when excesses 30% by weight, the rigidity of the composition is decreased. Further, the ethylene content of obtained copolymer is preferably controlled to 10-70% by weight, more preferably 20-65% by weight. The smaller the ethylene content is, the more the impact strength decreased, and the larger, the more the rigidity is decreased.

The melt index of obtained propylene polymer is 0. 1-50 g/10 min., preferably 0.5-35 g/10 min.

In the said polymerization reaction, the control of the intrinsic viscosity [η] may be performed by varying the concentration of molecular weight controlling agent (for example, $H_2$) properly. In each stage, the suitable pressure during the polymerization reaction is 1-30 kg/cm², preferably 2-15 kg/cm². The first stage and the second stage of the above mentioned polymerization reaction are both the process forming poropylene homopolymer, so the order may be altered.

Also, various polymerization methods, for example, sequential process using three or more of polymerization vessels, batch process using one or more of polymerization vessels and the combination of the sequential process and the batch process, are applicable to the above mentioned polymerization procedure. Further, the type of polymerization is not restricted, hence the suspension polymerization, solution polymerization, gas phase polymerization, etc. may be employed. The inert solvent for the suspension polymerization includes aliphatic hydrocarbons such as hexane, heptane, etc.; alicyclic hydrocarbons such as cyclohexane, etc.; and aromatic hydrocarbons such as benzene, toluene, etc.

The modified polymer obtained by adjusting the degradation degree of said propylene polymer (a) or (b) to 1.2–80, preferably 1.5–50, in the presence of organic peroxides may also be employed as the polymer (A) of this invention.

The organic peroxide which may be used in this invention includes ketone peroxides such as methylethylketone peroxide, methylisobutylketone peroxide, etc.; peroxyketals such as n-butyl-4,4-bis(t-butylperoxy) valerate, etc.; hydroperoxides such as cumene hydroperoxide, diisopropylbenzene hydroperoxide, etc.; dialkyl peroxides such as 1,3-bis(t-butylperoxyisopropyl)benzene, dicymul peroxide, etc.; diacyl peroxides such as benzoyl peroxide, decanoyl peroxide, etc.; percarbonates such as bis-4-t-butylcyclohexyl)peroxydicarbonate, etc.; peroxyesters such as t-butylperoxyacetate, t-butyl peroxylaurate, etc.

Particularly, the organic peroxides having not only a "ten hours-half life temperature" of not lower than 100° C. but also a "one minute-half life temperature" of not lower than the melting point of the propylene polymer are preferable. Such organic peroxide includes cumene hydroperoxide, diisopropylbenzene hydroperoxide, 1,3-bis (t-butylperoxyisopropyl)benzene, dicumyl peroxide, etc.

Further, the heat-treatment of the said propylene polymer is usually carried out by adding a proper amount of the said organic peroxide to the polymer at a temperature not only lower than the melting point but also lower than the degradation temperature, the melt kneading them with a uniaxial extruder, twin-screw extruder, kneader, Bambury mixer, roll mill etc. At the time, the heat-treatment should be so conditioned that a degradation degree (ie., the ratio between the melt indexes of the polymer after and before the modification, $MI_1MI_0$) of 1.2–80, preferably 1.5–50, may be attended. When the degradation degree is less than 1.2, the degree of modification is so little that the flowability of obtained modified propylene polymer composition is not sufficient, resulting in inferior moldability. On the other hand, when it is more than 80, the degradation proceeds too far, resulting in inferior impact strength of the composition.

The (B) component, the other component of this invention, is an ester derived from an aliphatic saturated monocarboxylic acid of from 12 to 22 carbon atoms and a polyhydric alcohol.

Any aliphatic saturated monocarboxylic acid of from 12 to 22 carbon atoms may be used as carboxylic acid, and concretely, such carboxylic acid includes lauric acid, myristic acid, palmitic acid, stearic acid, arachic acid, behenic acid, etc.

The polyhydric alcohol includes dihydric alcohols such as ethylene glycol, propylene glycol, ethylethylene glycol, trimethylene glycol, tetramethylene glycol, etc.,; trihydric alcolhols such as propanetriol, methylpropanetriol, buthantriol, pentanetriol, hexanetriol, etc.; tetrahydric alcohols such as erithritol, pentaerithritol, diglycerine, sorbitane, etc.; pentahydric alcohols such as adonitol, arabitol, etc.; hexahydric alcohols such as allitol, talitol, sorbitol, mannitol, etc. Particularly, trihydric alcohols are preferable.

Within the esters derived from these aliphatic saturated monocarboxylic acids and polyhydric alcohols, the monoesters of an aliphatic saturated monocarboxylic acid of from 13 to 20 carbon atoms and a polyhydric acid may be preferably used in this invention. Concretely, the monoester includes stearic acid monoglyceride, palmitic acid monoglyceride, myristic acid monoglyceride, etc.

These may be used either individually, or in a mixture of two or more of them. Also, the ester may contain not more than 20% by weight of unsaturated esters, other carboxylic acids, other alcohols, etc.

Also, in case of necessity, the composition of this invention may be added or blended with predetermined amount of conventional antioxydants, antistatic agents, UV stabilyzers, neutralizer, pigments, etc.

When the composition of this invention comprising (A) and (B) is prepared, 100 parts by weight of the above said polymer (A) is blended with 0.02–2.0 parts by weight of the ester (B). When the amount of the ester is less than 0.02 part by weight, the improvement effect in the whitening resistance of the composition is poor, and when more than 2.0 parts by weight, there occurs bleeding frequently, and the surface property deteriorates, causing the restrictions particularly on the application in the fields of foods. Preferably, the amount of the ester is 0.1–1.5 parts by weight, and more preferably, 0.1–1.0 part by weight.

When the modified polymer is employed, (1) the process in which the heat-treatment of the propylene polymer (a) or (b) in the presence of the organic peroxides is followed by the blending of ester (B); (2) the process in which the blending of the prolylene polymer (a) or (b) and ester (B) is followed by addition of the organic peroxides and heat-treatment; (3) the process in which the blending of propylene polymer (a) or (b), ester (B) and organic peroxides is followed by heat-treatment; and others may be employed. Although, from the viewpoint of operational convenience, the process (3) is preferable, other processes also give the same effects.

EXAMPLES 1–30 AND COMPARATIVE EXAMPLES 1–16

This invention is described in more details with reference to the following examples.

EXAMPLES 1–11

The propylene-ethylene copolymers A–I listed on Table 1 were synthesized by conventional two stage polymerization. The ethylene content, the polymer content and $[R]/f_{EEE}$ of obtained copolymer are shown in Table 1.

TABLE 1

|      | First stage | | Second stage | | |
| --- | --- | --- | --- | --- | --- |
| Type | Ethylene content (% by weight) | Polymer content (% by weight) | Ethylene content (% by weight) | Polymer content (% by weight) | $[R]/f_{EEE}$ |
| A | 0 | 89 | 24 | 11 | 5.7 |
| B | 0 | 85 | 39 | 15 | 2.8 |
| C | 1.0 | 84 | 37 | 16 | 4.7 |
| D | 0.5 | 92 | 44 | 8 | 3.2 |
| E | 3.0 | 90 | 40 | 10 | 7.5 |
| F | 1.0 | 85 | 8 | 15 | 7.7 |

TABLE 1-continued

| | First stage | | Second stage | | |
|---|---|---|---|---|---|
| Type | Ethylene content (% by weight) | Polymer content (% by weight) | Ethylene content (% by weight) | Polymer content (% by weight) | $[R]/f_{EEE}$ |
| G | 0 | 75 | 55 | 25 | 1.1 |
| H | 1.0 | 65 | 45 | 35 | 1.7 |
| I | 1.0 | 98 | 40 | 2 | 8.0 |

As the ester, five types of esters; a: stearic acid monoglyceride ( $C_{18}$; trade name : Rikemal S-100 produced by Riken Vitamin Co. Ltd. ), b: palmitic acid monoglyceride ( $C_{16}$; trade name: NAA-160 produced by Nihon Yushi Co. Ltd. ), c: myristic acid monoglyceride ( $C_{14}$; trade name : NAA-142 produced by Nihon Yushi Co. Ltd. ), d: lauric acid monoglyceride ( $C_{12}$; trade name: NAA-122 produced by Nihon Yushi Co. Ltd. ), e: oleic acid monoglyceride ( $C_{18}$, unsaturated; trade name: Rikemal OL-100 produced by Riken Vitamin Co. Ltd. ) were used.

The proplyene polymers and the esters were combinationed as shown in Table 2, and, after premixed in a Henschel mixer, melt kneaded in an extruder to form pellets, then the pellets were injection molded.

The flexural moduluses, Izod impact resistances and impact whitened areas of each obtained molding products were measured by the following procedure, and the results are shown in Table 2 en bolc.

flexural modulus: measured according to JIS K-7203
Izod impact strength : measured according to JIS K-7110 (notched type, 23° C.)
impact whitened area: An injection molded square board (65 mm×65 mm×3.2 mm) was placed on the bearer of a drop impact test equipment produced by Du Pont Co. Ltd., and the head of an ½ inch, impact marrow stick was setted so to touch the center of the square board, then after 1 kg's weight was dropped on the impact marrow stick from 50 cm height (temperature: 23° C.) to whiten the center of the square board, the square board was allowed to stand for one day, then the impact whitening area (cm²) was measured. The smaller the value is, the more superior is the whitened resistance.

ethylene content:determied by Infrared Spectrum

TABLE 2

| | Composition | | | Test result | | |
|---|---|---|---|---|---|---|
| | Type of the copolymer | Ester (type) | Ester (parts by weight) | Izod impact strength (kg · cm/cm) | Flexural modulus (kg/cm²) | Impact whitened area (cm²) |
| Example 1 | A | a | 0.5 | 4.8 | 13,600 | 1.3 |
| Example 2 | A | a | 1.0 | 4.9 | 13,500 | 0.8 |
| Example 3 | A | b | 0.5 | 4.8 | 13,600 | 1.5 |
| Example 4 | A | c | 0.7 | 4.8 | 13,600 | 1.2 |
| Comparative Example 1 | A | — | — | 4.7 | 13,500 | 2.5 |
| Example 5 | B | a | 0.5 | 9.0 | 12,600 | 3.1 |
| Example 6 | B | a | 1.0 | 8.9 | 12,500 | 2.5 |
| Comparative Example 2 | B | — | — | 9.1 | 12,600 | 4.2 |
| Example 7 | C | a | 0.5 | 12.2 | 11,300 | 1.8 |
| Example 8 | C | a | 1.0 | 12.1 | 11,200 | 1.4 |
| Example 9 | C | b | 0.7 | 12.1 | 11,400 | 1.7 |
| Example 10 | C | c | 0.5 | 12.3 | 11,300 | 1.9 |
| Comparative Example 3 | C | — | — | 12.1 | 11,300 | 3.0 |
| Comparative Example 4 | C | d | 1.0 | 12.0 | 11,400 | 3.2 |
| Comparative Example 5 | C | e | 1.0 | 12.2 | 11,400 | 3.2 |
| Example 11 | D | a | 0.5 | 4.1 | 13,800 | 1.9 |
| Comparative Example 6 | D | — | — | 4.3 | 13,800 | 2.8 |
| Comparative Example 7 | E | a | 0.5 | 7.3 | 7,000 | 1.2 |
| Comparative Example 8 | F | a | 0.5 | 2.5 | 8,500 | 1.4 |
| Comparative Example 9 | G | a | 1.0 | 68 | 10,100 | 5.9 |
| Comparative Example 10 | H | a | 0.5 | not destructed | 9,000 | 7.2 |
| Comparative Example 11 | I | a | 0.5 | 2.1 | 10,500 | 1.1 |

EXAMPLES 12-17 AND COMPARATIVE EXAMPLES 12, 13

Propylene polymers listed on Table 3 were prepared by conventional two stage polymerization process. To 100 parts by weight of each propylene polymers, the listed amount of a: stearic acid monogryceride ( trade name: Rikemal S-100 produced by Riken Vitamin Co., Ltd.) or b: palmitic acid monogryceride ( trade name : NAA-160 produced by Nihon Yushi Co. Ltd.) and 0.01-0.06 part by weight of 1,3-bis(t-butylperoxyisopropyl)benzen was added, mixed homogeneously, then melt-blended in an extruder at 220° C. to form pellets of modified propylene polymer compositions.

The pellets were injection molded to form test strips. The same measurements as in Examples 1-11 were carried out, and the test results are shown in Table 3.

EXAMPLE 18

To 100 parts by weight of a propylene polymer prepared by the same way as Example 12-17, 1,3-bis(t-butylperoxyisopropyl)benzen was added, then melt blended in an extruder at 220° C. to prepare a modified polymer. 100 parts by weight of this polymer was added by 0.5 part by weight of stearic acid monogryceride ( trade name: Rikemal S-100 produced by Riken Vitamin Co. Ltd.), then formed in to pellets.

The pellets were injection molded to form test strips. The same measurements as in Example 1-11 were carried out, and the test results are shown in Table 3.

drop impact strength : determined in accordance with Du Pont method (curvature of impact marrows head: 0.25 inch, anvil diameter : 2 inches)

melt index (MI) : measured according to JIS K-7210

Further, the polymerization reaction in the third stage was carried out by feeding a propylene-ethylene mixture and measured hydrogen for 30 minutes, the temperature being maintained at 50° C., for 30 minutes. Then, after the removal of unreacted propylene, 50 milli liters of n-butanol was added to the polymerization product, then the catalyst was decompositioned by stirring for one hour at 65° C. Thereafter, white powder polymer was obtained via separation process, washing process and drying process.

TABLE 3

| | Propylene Polymer | | | | | | | Test result | | | | |
|---|---|---|---|---|---|---|---|---|---|---|---|---|
| | Ethylene content (wt %) | Polymer content (wt %) | Ethylene content (wt %) | Polymer content (wt %) | [R]/EEE | $MI_0$ before modification g/10 min. | $MI_1$ after modification g/10 min. | Degradation degree (—) | Ester | | Drop impact strength (−20° C.) $kg \cdot cm^2$ | Flexural modulus $kg \cdot cm$ | Impact whitened area $cm^2$ |
| | | | | | | | | | Type | part by weight | | | |
| Example 12 | 0 | 85 | 38 | 15 | 2.7 | 2.5 | 40 | 16 | a | 0.5 | 130 | 12400 | 2.8 |
| Example 13 | 0.5 | 92 | 41 | 8 | 3.3 | 15 | 34.5 | 2.3 | a | 0.5 | 89 | 13100 | 1.7 |
| Example 14 | 0 | 80 | 31 | 20 | 3.0 | 13 | 40.3 | 3.1 | a | 0.5 | 140 | 12500 | 2.3 |
| Example 15 | 0 | 75 | 45 | 25 | 1.1 | 12 | 34.8 | 2.9 | a | 0.5 | 96 | 9700 | 6.2 |
| Example 16 | 0 | 89 | 24 | 11 | 5.8 | 7.3 | 29.9 | 4.1 | a | 1.0 | 65 | 13700 | 0.8 |
| Example 17 | 1.0 | 86 | 25 | 14 | 6.1 | 0.7 | 28.0 | 40.0 | b | 0.5 | 158 | 11400 | 1.5 |
| Example 18 | 1.0 | 86 | 35 | 14 | 6.1 | 4.2 | 23.1 | 5.5 | a | 0.5 | 136 | 11200 | 1.5 |
| Comparative Example 12 | 0 | 89 | 24 | 11 | 5.8 | 30 | 30.0 | 1.0 | a | 0.5 | 18 | 14300 | 1.6 |
| Comparative Example 13 | 0 | 88 | 32 | 12 | 4.9 | 8.7 | 45.2 | 5.2 | — | — | 73 | 13400 | 3.7 |

EXAMPLES 19-24 AND COMPARATIVE EXAMPLES 14, 15

Preparation of propylene polymers 5 liters of dehydrated n-heptane was fed into an autoclave with a capacity of 10 liters attached with an agitator, then 1.0 g of diethylaluminium chloride and 0.3 g of titanium trichloride were added.

The polymerization reaction in the first stage was carried out by continuously feeding hydrogen so measured as to form a propylene polymer having a predetermined intrinsic viscosity and propylene whereby a reaction pressure 9 kg/cm² is established, for 90 minutes with stirring, the temperature of the liquid phase being maintained at 65° C. Thereafter, unreacted propylene was removed, and the temperature of the liquid phase was lowered to 50° C.

Thereafter, the polymerization reaction in the second stage was carried out by continuously feeding measured hydrogen and propylene for 40 minutes, the temperature being maintained at 50° C., the pressure at 9 kg/cm².

Preparation of composition

As the fatty acid esters, a: stearic acid monoglyceride (trade name: Rikemal S-100 produced by Riken Vitamin Co., Ltd.), b: palmitic acid monoglyceride (trade name: NAA-160 produced by Nihon Yushi Co. Ltd.), d: lauric acid monoglyceride (trade name NAA-122 produced by Nihon Yushi Co. Ltd.), e: oleic acid monoglyceride (unsaturated carboxyric acid ester) were employed.

Above mentioned propylene polymers and fatty acid esters were melt blended in a combination and ratio listed on Table 4 to form pellets, then the pellets were injection molded to form test strips. The same measurements as in Example 1-11 were carried out, and the test results are shown in Table 4.

intrinsic viscosity: measured in tetralin, at 135° C.

TABLE 4

| | Propylene polymer | | | | | | Ester | | Test result | | |
|---|---|---|---|---|---|---|---|---|---|---|---|
| | First stage | | Second stage | | Third stage | | | | | | |
| | [η] dl/g | Polymer content (wt %) | [η] dl/g | Polymer content (wt %) | [η] dl/g | Polymer content (wt %) | Ethylene content (wt %) | Type | Amount of addition part by weight | Izod impact strength $kg \cdot cm/cm$ | Flexural modulus $kg \cdot cm^2$ | Impact whitened area $cm^2$ |
| Example 19 | 1.3 | 71 | 3.8 | 19 | 3.5 | 10 | 42 | a | 0.5 | 7.5 | 14100 | 1.8 |
| Example 20 | 1.3 | 71 | 3.8 | 19 | 3.5 | 10 | 42 | a | 1.0 | 7.7 | 14000 | 1.4 |
| Example 21 | 1.3 | 71 | 3.8 | 19 | 3.5 | 10 | 42 | b | 0.5 | 7.7 | 14200 | 1.7 |
| Example 22 | 1.3 | 71 | 3.8 | 19 | 3.5 | 10 | 42 | d | 1.0 | 7.6 | 14100 | 3.0 |
| Comparative Example 14 | 1.3 | 71 | 3.8 | 19 | 3.5 | 10 | 42 | e | 1.0 | 7.7 | 14200 | 4.3 |
| Comparative Example 15 | 1.3 | 71 | 3.8 | 19 | 3.5 | 10 | 42 | — | — | 7.9 | 14000 | 4.5 |
| Example 23 | 2.0 | 75 | 2.7 | 13 | 4.1 | 12 | 35 | a | 0.5 | 8.1 | 13800 | 1.9 |
| Example 24 | 1.7 | 76 | 3.5 | 8 | 3.2 | 16 | 65 | a | 1.0 | 29 | 13100 | 4.5 |

EXAMPLE 25-29 AND COMPARATIVE EXAMPLE 16

Preparation of propylene polymer

Propylene polymers were prepared by the same way as in Examples 19-24.

Preparation of composition

To 100 parts by weight of each propylene polymers, the listed amount of a: stearic acid monoglyceride (trade name: Rikemal S-100 produced by Riken Vitamin Co. Ltd.) or b: parmitic acid monoglyceride (trade name: NAA-160 produced by Nihon Yushi Co. Ltd.) and 0.02–0.15 part by weight of 1,3-bis(t-butylperoxyisopropyl)benzen were added, mixed homogeneously, then melt-blended in an extruder at 220° C. to form pellets of modified propylene polymer compositions.

The pellets were injection molded to form test strips. The test results are shown in Table 5.

EXAMPLE 30

To the propylene polymer obtained by the same way as in Example 25–29, 1,3-bis(t-butylperoxyisopropyl)benzen was added, mixed homogeneously, then melt-blended in an extruder at 220° C. to form a polymer. 0.5 part by weight of stearic acid monoglyceride (trade name : Rikemal S-100 produced by Riken Vitamin Co. Ltd.) was added to 100 parts by weight of this polymer to form pellets of a modified propylene polymer composition.

The pellets were injection molded to form a test strip. The same measurements as in Example 12–18 were carried out, and test results are shown in Table 5.

TABLE 5

| | Propylene polymer | | | | | | | | | Ester | | Test result | | |
|---|---|---|---|---|---|---|---|---|---|---|---|---|---|---|
| | First stage | | Second stage | | Third stage | | | $MI_0$ before modification g/10 min. | $MI_1$ after modification g/10 min. | Degradation degree (—) | Amount of addition | Drop impact strength (−20° C.) | Flexural modulus | Impact whitened area |
| | [η] dl/g | Polymer content (wt %) | [η] dl/g | Polymer content (wt %) | [η] dl/g | Polymer content (wt %) | Ethylene content (wt %) | | | | Type | part by weight | kg · cm | kg · cm² | cm² |
| Example 25 | 2.5 | 74 | 4.8 | 14 | 3.5 | 12 | 21 | 0.7 | 31.5 | 45 | a | 0.5 | 96 | 14100 | 1.5 |
| Example 26 | 2.5 | 74 | 4.8 | 14 | 3.5 | 12 | 21 | 0.7 | 14.7 | 21 | a | 0.5 | 102 | 14200 | 1.6 |
| Example 27 | 2.5 | 74 | 4.8 | 14 | 3.5 | 12 | 21 | 0.7 | 8.4 | 12 | b | 0.5 | 125 | 14400 | 1.6 |
| Example 28 | 1.1 | 76 | 4.0 | 14 | 3.9 | 10 | 45 | 12.0 | 36.0 | 3 | a | 0.5 | 87 | 15500 | 1.8 |
| Example 29 | 1.8 | 70 | 4.0 | 20 | 3.9 | 10 | 45 | 1.3 | 35.1 | 27 | a | 0.5 | 116 | 14400 | 1.8 |
| Example 30 | 1.8 | 70 | 4.0 | 20 | 3.9 | 10 | 45 | 1.3 | 15.6 | 12 | a | 0.5 | 145 | 14200 | 1.8 |
| Comparative Example 16 | 2.5 | 74 | 4.8 | 14 | 3.5 | 12 | 21 | 0.7 | 14.0 | 20 | — | — | 108 | 14100 | 3.1 |

What is claimed is:

1. A propylene polymer composition comprising
(A) 100 parts by weight of a propylene polymer or a modified polymer obtained by heat-treating said propylene polymer in the presence of an organic peroxide to a degradation degree of 1.2–80, said propylene polymer essentially consisting of the following two fractions (a) or three fractions (b) obtained by polymerization over a stereoregular catalyst:
(a)
  (i) 70–95% by weight of a propylene homopolymer or a propylene-ethylene copolymer having an ethylene content of not more than 2% by weight; and
  (ii) 30–5% by weight of a propylene-ethylene copolymer having an ethylene content of 10–50% by weight; or
(b)
  (iii) 50–94% by weight of a propylene homopolymer having an intrinsic viscosity [η] of 0.5–2.5 dl/g;
  (iv) 3–30% by weight of a propylene homopolymer having an intrinsic viscosity [η] of more than 2.5 dl/g; and
  (v) 3–30% by weight of a propylene-ethylene copolymer having an intrinsic viscosity [η] of not less than 2.8 dl/g; and
(B) 0.1 to 1.5 parts by weight of an ester derived from an aliphatic saturated monocarboxylic acid of from 12 to 22 carbon atoms and a polyhydric alcohol.

2. The composition according to claim 1 wherein said propylene polymer essentially consists of the following three fractions (b):
  (iii) 50–94% by weight of a propylene homopolymer having an intrinsic viscosity [η] of 0.7–2.3 dl/g;
  (iv) 3–30% by weight of a propylene homopolymer having an intrinsic viscosity [η] of 2.6–10 dl/g; and
  (v) 3–30% by weight of a propylene-ethlene copolymer having an intrinsic viscosity [η] of 3.0–12 dl/g.

3. The composition according to claim 1 wherein said modified polymer is obtained from the propylene polymer essentially consisting of the following three fractions (b):
  (iii) 50–94% by weight of a propylene homopolymer having an intrinsic viscosity [η] of 0.7–2.3 dl/g;
  (iv) 3–30% by weight of a propylene homopolymer having an intrinsic viscosity [η] of 2.6–10 dl/g; and
  (v) 3–30% by weight of a propylene-ethylene copolymer having an intrinsic viscosity [η] of 3.0–12 dl/g.

4. The composition according to claim 1 wherein said propylene polymer essentially consisting of the two fractions (a) having a triad fraction: $[R]/f_{EEE}$ of not less than 2.

5. The composition according to claim 1 wherein said ester is obtained from an aliphatic saturated monocarboxylic acid selected from the group consisting of lauric acid, myristic acid, palmitic acid, stearic acid, arachic acid and behenic acid and a trihydric alcohol.

6. The composition according to claim 5 wherein said trihydric alcohol is selected from the group consisting of propanetriol, methylpropanetriol, buthanetriol, pentanetriol and hexanetriol.

7. The composition according to claim 5 wherein said ester is stearic acid monoglyceride or palmitic acid monoglyceride.

8. The composition according to claim 1 wherein said organic peroxide is 1,3-bis(t-butylperoxyisopropyl)benzene.

* * * * *